US010671509B1

(12) United States Patent
Thompson et al.

(10) Patent No.: US 10,671,509 B1
(45) Date of Patent: Jun. 2, 2020

(54) SIMULATING STORAGE SERVER CONFIGURATIONS

(71) Applicant: Amazon Technologies, Inc., Seattle, WA (US)

(72) Inventors: James Michael Thompson, Seattle, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 14/728,836

(22) Filed: Jun. 2, 2015

(51) Int. Cl.
*G06F 11/34* (2006.01)
*G06Q 10/06* (2012.01)

(52) U.S. Cl.
CPC ....... *G06F 11/3457* (2013.01); *G06Q 10/067* (2013.01); *G06Q 10/06315* (2013.01)

(58) Field of Classification Search
None
See application file for complete search history.

(56) References Cited

U.S. PATENT DOCUMENTS

2003/0093619 A1* 5/2003 Sugino .................. G06F 3/0605
711/114
2014/0207944 A1* 7/2014 Emaru .................. H04L 47/803
709/224

OTHER PUBLICATIONS

Jung, Gueyoung, et al. "Cloudadvisor: A recommendation-as-a-service platform for cloud configuration and pricing." Services (SERVICES), 203 IEEE Ninth World Congress on. IEEE, 2013.*
Mylavarapu, Swarna, Vijay Sukthankar, and Pradipta Banerjee. "An optimized capacity planning approach for virtual infrastructure exhibiting stochastic workload." Proceedings of the 2010 ACM Symposium on Applied Computing. ACM, 2010.*
Beloglazov, Anton, and Rajkumar Buyya. "Managing overloaded hosts for dynamic consolidation of virtual machines in cloud data centers under quality of service constraints." IEEE Transactions on Parallel and Distributed Systems 24.7 (2013): 1366-1379. (Year: 2013).*
Sharma, U., Shenoy, P., Sahu, S., & Shaikh, A. (Jun. 2011). A cost-aware elasticity provisioning system for the cloud. In 2011 31st International Conference on Distributed Computing Systems (pp. 559-570). IEEE. (Year: 2011).*

* cited by examiner

*Primary Examiner* — Bijan Mapar
(74) *Attorney, Agent, or Firm* — Davis Wright Tremaine LLP

(57) ABSTRACT

A remote data storage service may operate one or more storage servers configured to maintain logical volumes on behalf of customers of the remote data storage service. Historical data associated with customer interaction with the logical volumes may be obtained by the remote data storage service. One or more probability models may be generated to evaluate various different configurations of the storage servers. The various configurations of the storage servers may be simulated using the one or more probability models and an optimal configuration may be determined.

21 Claims, 8 Drawing Sheets

Historical Volume Data

| | |
|---|---|
| Volume ID 302 | 1747011285 |
| Timestamp 304 | 04/08/2015 16:23:42 |
| Read Megabytes 306 | 500 |
| Write Megabytes 308 | 100 |
| Read Operations 310 | 16,000 |
| Write Operations 312 | 320 |
| Active Seconds 314 | 10 |
| Gigabytes 316 | 200 |

FIG. 3

SIMULATING STORAGE SERVER CONFIGURATIONS

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may expose one or more logical volumes to the virtual machine instances. The logical volumes may be implemented by one or more data storage servers using one or more block-level storage devices. The data storage servers implementing the logical volumes may be distributed over various geographical regions. Furthermore, the logical volume may be duplicated on a plurality of the data storage servers. The service provider may ensure that the duplicate volume contains the same information and when customers modify the logical volume the modifications are reflected in each duplicate logical volume.

To reduce cost the computing resource service provider may oversubscribe the computing resources used to provide customers with remote program execution and remote data storage. However, oversubscription of computing resources may cause degradation in service to customers during intervals of heavy customer activity. The computer resources that provide services to customers may employ various techniques to protect the computer resources from an overwhelming number of service requests that could potentially overload the computer resources. In general, a computer resource is considered to be in an "overloaded" state if it is not able to provide the expected quality of service for at least some portion of customer requests it receives. Furthermore different hardware and software configurations of the computing resources used to provide remote program execution and remote data storage may affect performance and degradation of the computing resources during intervals of heavy utilization. It may be difficult for the computing resource service provider to determine which combinations of hardware and software configurations will perform the best for the given situation or have a higher risk of performance degradation, for example during intervals of heavy utilization by customers of the computing resource service provider.

BRIEF DESCRIPTION OF THE DRAWINGS

Various embodiments in accordance with the present disclosure will be described with reference to the drawings, in which:

FIG. 3 illustrates an example of historical volume data for a volume maintained by a remote storage service in accordance with an embodiment;

DETAILED DESCRIPTION

Figure 1:
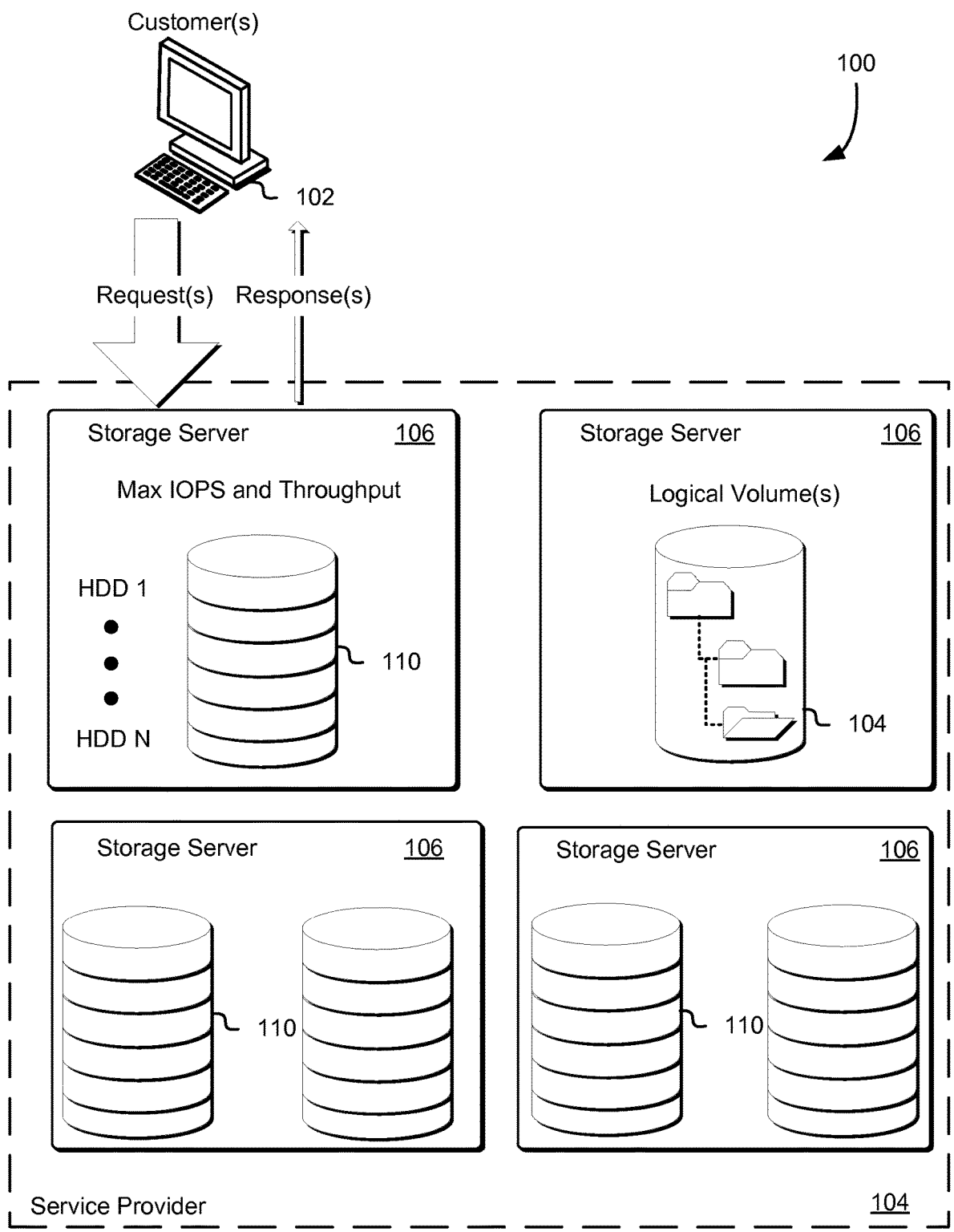
FIG. 1 illustrates an example environment in which customers on a computing resource service provider share resources of a data storage server in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements in configurations of storage servers of a remote storage service by generating simulations configured to calculate the risk or probability of overloading the storage servers, for example by using historical data. The remote storage service may be provided by a computing resource service provider, and the remote storage service may use one or more network attached storage devices, such as block-level storage devices, to provide data storage for customers of the computing resource service provider. To reduce the cost of the computing resources, such as the block-level storage devices, provided to the customers of the computing resource service provider, computer systems providing the customers with access to the computing resources may be "oversubscribed."

Oversubscribing computing resources may include offering more of the computing resource to customers than there is actually physical capacity for on the computer systems providing the computing resources to the customers. In general, a customer may not consume the entire portion of the computer systems resources allocated to the customer. Oversubscription enables the computing resource service provider to increase efficiency and reduce the amount of un-utilized or under-utilized computing resources made available to customers. When computing resources of the computer system are oversubscribed, the computer system may become overloaded when multiple customers attempt to consume the entire portions of their allotted computing resources at or near the same time. Different hardware and software configurations of the storage servers may be used to prevent the computer system from being overloaded while enabling the customers to continue to receive a high level of performance.

Additionally, a certain amount of computing resources may be required to satisfy the requirements of the customers on the computing resource service provider. For example, the remote storage service may provide the customers with access to block-level storage devices. The block-level storage devices may have a certain number of Input/Output Operations per Second (IOPS) that the block-level storage devices are capable of executing. For example, a particular block-level storage device may have a maximum of 1,500 IOPS that the particular block-level storage device is capable of performing. Furthermore, the block-level storage devices may have a certain capacity, e.g., a particular block-level storage device may have a maximum capacity of 2 terabytes (TB) which may be utilized to provide customers with logical volumes configured to stored data for the customers. The storage servers providing computing resources to the customers of the computing resource service provider may include a plurality of block-level storage devices. Each block-level storage device may have a maximum size and a maximum number of IOPS. For example, a particular storage server may include six 1 TB hard disk drives (HDD) with a maximum IOPS of 1,000 and six 4 TB HDD with a maximum IOPS of 1,000. The particular storage server would have 30 TB of storage with a maximum IOPS of 12,000.

Any number of possible hardware and/or software configurations of the storage servers may be implemented by remote storage service. The hardware configurations may include a capacity of the block-level storage device or a maximum number of IOPS the block-level storage device is capable of achieving. The software configurations may include a logical volume placement algorithm or throttling algorithm. However, different hardware and/or software configurations may have a greater probability of being overloaded as a result of oversubscription of computing resources. Simulations of various hardware and/or software configurations may be executed by the computing resource service provider in order to determine an optimal configuration for the storage servers. The optimal configuration may reduce that probability of the storage server becoming overloaded as a result of the oversubscription of computing resources or may be optimal in one or more other dimensions, such as cost, power consumption, computing capacity, storage capacity, or any other attribute of the storage servers.

To generate the simulations the remote storage service may obtain historical data corresponding to customer volumes maintained by the remote storage service. For example, the remote storage service may use log data indicating read and write operations performed by the customers using the remote storage service to generate historical data suitable for generating a probability model, described in greater detail below. Once the computing resources service provider has obtain historical data indicating customer interaction with the remote storage service, in various embodiments, the computing resource service provider executes various simulations, such as Monte Carlo simulations, based at least in part on the historical data in order to determine a risk of the storage server becoming overloaded given particular hardware and/or software configurations. The simulations may be executions of computational algorithms that rely on repeated random sampling to obtain numerical results. For example, Monte Carlo simulations may include repeated samplings of the historical data in which a capacity of a storage server is selected at random, random volumes are added to the storage server until the selected capacity is reach, and the number of IOPS are summed for each volume added to the storage server. The information for the simulations may be selected at random from the historical data. Furthermore, the historical data may be modified to provide additional simulation described in greater detail below.

FIG. 1 illustrates an example environment 100 where one or more computer systems, as well as the associated code running thereon, may provide customers 102 with logical volumes 104 wherein the logical volume may be stored by a service provider 104 using storage servers 106. Customer data may be stored across a variety of different data storage servers 106 containing one or more storage devices such as block-level storage devices, illustrated in FIG. 1 as HDDs1 through N 110. The customer data stored on the different devices may be exposed to a computer system operated by the customer and including a logical volume 104. Described in greater detail below, the customer may instantiate one or more virtual machines on computing resources of the computing resource service provider 104, and the one or more virtual machines may attach the exposed logical volumes 104 to enable the customer to interact with the data stored in the logical volumes 104 maintained by the remote storage service using one or more storage servers 106. The logical volume 104 may contain one or more files which are simultaneously accessible to multiple computer systems operated by customers 102 of the computing resource service provider 104.

As described above, the computing resources of the storage servers 106 may be oversubscribed and, as a result, the storage servers 106 may receive more requests than the storage servers 106 are capable of responding to during interval of heavy customer 102 activity, illustrated in FIG. 1 as a larger request arrow and a smaller response arrow. The storage servers 106 response may be limited by the maximum number of IOPS the storage server may perform. For example, as described above, a particular HDD may have a maximum of 100 IOPS and the storage server 106 may have 12 HDDs with a maximum of 100 IOPS, therefore the storage server 106 may have a maximum of 1,200 IOPS. The maximum number of IOPS may be determined based at least in part on a number of random input and output (I/O) operations the storage device may complete in an interval of time. However, the storage device may be capable of exceeding the maximum number of IOPS in various situations, such as, for a set of sequential I/O operations. For the purposes of the present disclosure, the maximum number of IOPS may be an estimation of the capabilities of a particular storage device and the actual number of IOPS achieved by the particular storage device may exceed or fall short of the maximum number of IOPS. Additionally, the storage servers 106 response may be limited by a maximum throughput of the block-level storage devices included in the storage servers. The throughput of a particular block-level storage device (e.g., data transfer rate) may include both the internal rate and the external rate. The internal rate may include the rate at which data may be transmitted between components of the particular block-level storage device, such as between a disk surface and a controller of the particular block-level storage device. The external rate may include the rate at which data may be transmitted between the particular block-level storage device and external hardware, such as between the controller of the particular block-level storage device and the storage server 106. The maximum throughput and maximum IOPS of the storage server 106 may be considered as a constraint on the storage server 106.

As illustrated by FIG. 1 the storage servers 106 may include a pool or other collection of storage devices 1 through N configured to store data on behalf of customers 102 of the computing resource service provider 104. As described in greater detail below in connection with FIG. 3, the storage servers 106 may obtain historical data corresponding to the customer requests received by the remote storage service. The historical data may be used by the computing resource service provider 104 to execute one or more simulations of the storage servers 106 under various hardware and/or software configurations. The computing resource service provider 104 may use the result of the simulations to provide customers 102 with feedback and provide suggestions for various services offered by the remote storage service and/or computing resource service provider 104 that may result in greater cost savings or better storage performance. Additionally, the simulations may be used to determine future load on the storage servers 106, which may be used to modify one or more attributes of the storage service, such as, a capacity of the storage server advertised to customer 102 or other components of the computing resource service provider 104, hardware and/or software configurations of the storage servers 106, and any other attribute suitable for optimizing the performance of the storage servers 106 in one or more dimensions. The hardware configuration of the storage servers 106 may include network interfaces, rack, switches, HDDs, solid-state drives or other storage devices, processors, memory, or any other physical component of the storage servers 106. The software configuration of the storage servers 106 may include logical volume placement algorithms, operating systems, hypervisors, throttling applications or other application managing customer access to computing resources of the storage servers 106, and any other application loaded into memory of the storage servers 106.

In various embodiments, the storage servers 106 involved in implementing the volumes may collect workload information to be used for historical data when in simulation. For example, a storage server 106 may collect I/O information of volumes for use in simulations, such as Monte Carlo simulations. In some embodiments, the storage servers 106 may be able to isolate the workload metrics for different computer instances that are attached to the volumes or partitions, and use the metrics in various simulations corresponding to the isolated workload or a customer associated with the isolated workload.

Figure 2:
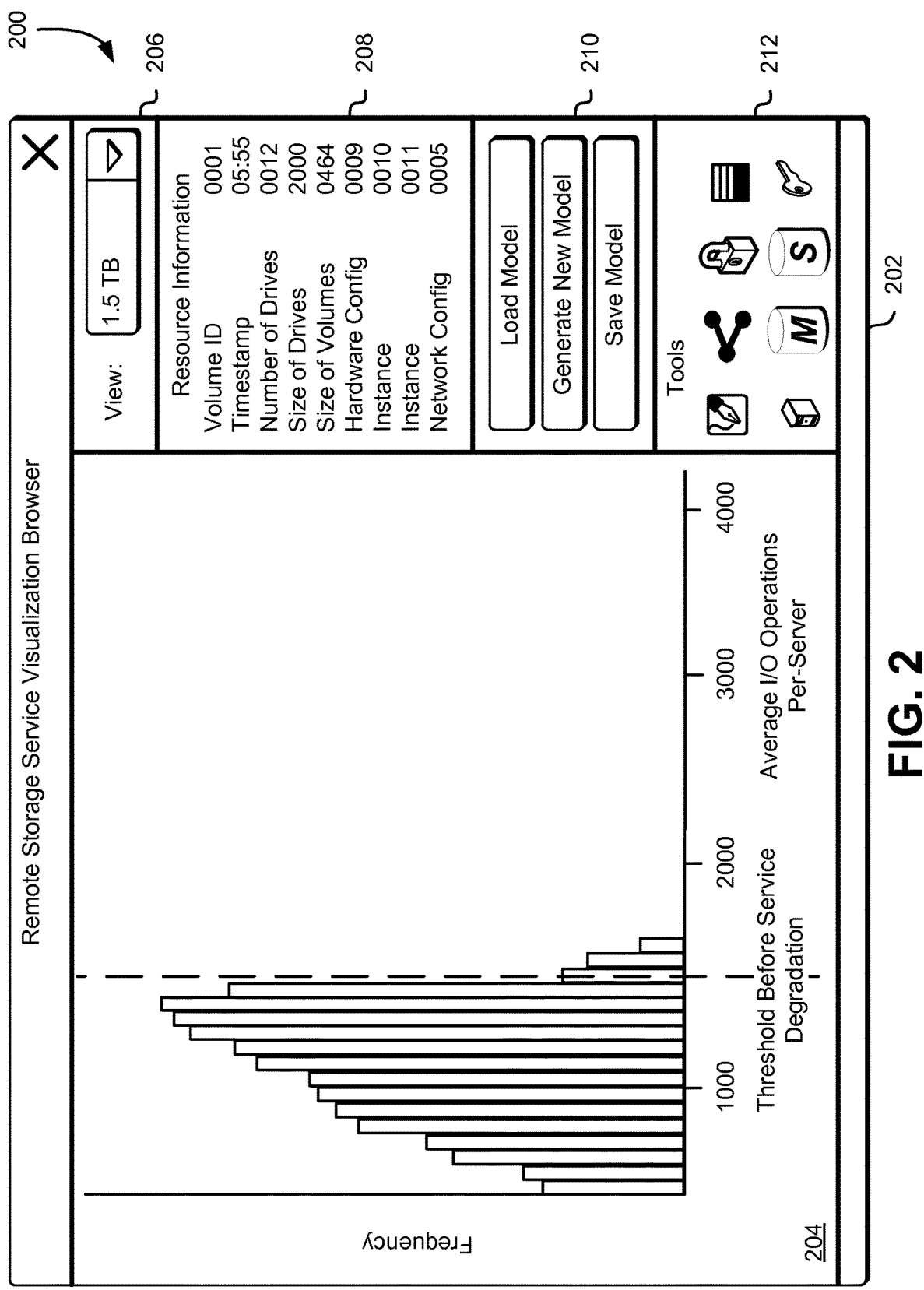
FIG. 2 illustrates an example environment where a remote storage service visualization browser may be used to display simulation result in accordance with an embodiment.

FIG. 2 illustrates an example environment 200 where a remote storage service visualization browser may be used to display various simulations as described herein at least in connection with FIG. 1 and in accordance with at least one embodiment. A remote storage service visualization browser 202 may be configured to produce visualization diagrams corresponding to simulations generated using historical data associated with logical volumes maintained by the remote storage service as described herein above, save simulation diagrams, load simulation diagrams, apply filtering and/or analysis processes to simulation diagrams and/or perform other such processes associated with simulations of the storage servers of the remote storage service. The remote storage service visualization browser 202 may be configured as a computer service such as a web service and may be provided as a service by the computing resource service provider as described herein at least in connection with FIG. 1.

The remote storage service visualization browser 202 may include functionality 210 to perform operations such as loading historical data, generating simulations and corresponding visualizations, saving simulation visualizations and/or other such functionality. The simulation information and corresponding visualizations may be saved in a log repository, a data store, a logical volume, or some other such location. The remote storage service visualization browser 202 may include functionality 208 to display at least a subset of the simulation information and may also include functionality to display the filtered results of the simulations as a result of applying one or more filtering processes 206. The filtering processes 206 may be based at least in part on one or more attributes of a configuration of the storage servers.

For example, as illustrated in FIG. 2, the simulations are filter based at least in part on a storage server with 1.5 TB block-level storage devices. Other attributes of the storage servers may include processing capacity, network capacity, software executed by the storage servers, power capacity, or any other attribute of the storage servers that may be modified.

The remote storage service visualization browser 202 may further be configured to produce a simulation diagram 204 based at least in part on the simulation information and/or based at least in part on the filtered simulation information, where the simulation information may include the result of multiple simulations, for example using the Monte Carlo method as described above. For example, the remote storage service visualization browser 202 may be configured to execute a plurality of simulations, each simulation based at least on a random or pseudorandom sampling of the historical data, described in greater detail below in connection with FIG. 3. The simulation diagram 204 may be displayed using block diagrams, generated images, or visualization elements and may, in some embodiments, include one or more icons.

The remote storage service visualization browser 202 may include a set of tools 212 used to perform various functions in connection with the displayed network flow diagram 204. The set of tools 212 may be a set of functions included in the remote storage service visualization browser 202 that enables a user to perform a variety of operations such as analyzing the simulation diagram 204 or altering the simulation diagram 204. For example, the tools 212 may analyze the simulations to determine an optimal configuration for various attributes of the storage servers such as power consumption, degradation of service, oversubscription regimes, placement algorithms, hardware and/or software configuration, networking parameters, or other attributes affecting performance of the storage server. The computer system executing the remote storage service visualization browser 202 or other computer system may determine the optimal solution using a variety of different methods including grid search, curve fitting, and/or interpolation. The tool 212 may also be used to provide a quote for a particular customer workload at a particular time. For example, the customer may provide the requirements for the workload (e.g., 200 IOPS minimum to process 350 gigabytes of data) using a tool 212 of the remote storage service visualization browser 202 and receive, in response, a quote indicating the cost of executing the customer workload using various services and/or storage servers of the computing resource service provider.

As illustrated in FIG. 2, the simulation diagram 204 may be based at least in part on an average number of I/O operations per-server based at least in part on a configuration of the servers and historical data of customer interactions with the remote storage service. Furthermore, the simulation diagram 204 may include an indication of an IOPS threshold above which customers of the remote storage service may receive a degradation in service (e.g., customer requests may not be serviced by the storage servers). The remote storage service visualization browser 202 may generate one or more graphs to include in the simulation diagram indicating a total amount of IOPS for each logical volume of a storage server over an interval based at least in part on the historical data obtained by the remote storage service. For example, the simulation diagram 204 illustrates the frequency (e.g., height of the bar relative to the Y-axis) at which a storage server will experience the average number of IOPS indicated on the X-axis. The simulation diagram 204 may include the frequency for an average number of IOPS for a single storage server configuration. In various embodiments, the simulation diagram 204 additionally include text elements displaying, for example, tags 208 associated with resource types, tags 208 associated with resource instances, tags 208 associated with resource groups, tags 208 associated with networks or combinations of these and/or other such tags 208. Furthermore, the tags 208 may be based at least in part on information included in the historical data, such as a volume ID or storage server hardware configuration.

The simulation diagram 204 may additionally include text elements displaying other data and/or metadata associated with the resources, the resource groups, the networks, the structured description and/or the computer system. In some embodiments, the remote storage server visualization browser 202 may include functionality to update (or refresh) the simulation diagram 204 and may, in some embodiments, include functionality to provide settings relating to that update. For example, the simulation diagram 204 may be updated automatically once additional historical data for a particular customer or particular service is obtained by the storage servers implementing the remote storage service or other service.

As may be contemplated, the contents of the remote storage service visualization browser 202 illustrated herein relating to browser functionality, display modalities, the presence and type of text elements, the presence and type of icon elements and/or other such user interface elements described herein in connection with the remote storage service visualization browser 202 are merely illustrative examples indicating an embodiment of the remote storage service visualization browser 202. As such, other types of browser functionality, display modalities, presence and type of text elements, presence and type of icon elements and/or other such user interface elements may be considered as within the scope of the present disclosure.

FIG. 3 illustrates an example of historical volume data 300 for a volume maintained by a remote storage service in accordance with an embodiment. The historical volume data may be obtained by the remote storage service by at least collection information for request, submitted by customers to the remote storage service, to interact with logical volumes maintained by the remote storage service. The request may be received at a request processing subsystem of the remote storage service described in greater detail below in connection with FIG. 7. The request may include at least in an identifier of the volume or volume ID and an I/O operation to be performed. At least a portion of the historical volume data 300 may be obtained from the request to the remote storage service.

The historical volume data 300 may include at least a volume ID 302, a timestamp 304, an number of read megabytes 306 (MB), a number of write MBs 308, a number of read operations 310, a number of write operations 213, a number of active seconds 314, and a number of gigabytes 316. (GB). The remote storage service may obtain historical volume data 300 for all or a portion of the volumes maintained by the remote storage service. The volume ID 302 may be a logical identifier of a particular volume and may be a unique identifier of the volume with respect to the remote storage service. The timestamp 304 may indicate a particular time the historical volume data is representative of, for example, a time at which the historical volume data was obtained.

The read MBs 306 may indicate a number of MBs the customer has read from the logical volume over an interval of time up until the timestamp 304. The write MBs 308 may indicate a number of MBs the customer has written to the logical volume over an interval of time up until the timestamp 304. The read operations 310 may indicate a number of read operations caused to be executed on the logical volume by the customer over an interval of time up until the timestamp 304. The write operations 310 may indicate a number of write operations caused to be executed on the logical volume by the customer over an interval of time up until the timestamp 304. The active seconds 314 may indicate an interval of time the logical volume was accessed by the customer over an interval of time up until the timestamp 304. The gigabytes 316 may indicate a total capacity of the logical volume.

The historical volume data may be used by the remote storage simulation browser or other application to generate simulations of various storage servers as described above. The remote storage service may maintain a set of historical data suitable for use in generating simulations. In various embodiments, the historical data is modified to inject entropy into the simulation and generate a probability distribution based at least in part on the maximum entropy principle. For example, the number of write operations 312 may be randomly or pseudorandomly modified for use in various simulations. During the simulations, a random or pseudorandom sampling of the historical volume data 300 may be obtained in order to run the simulations. The probability distributions describe herein may include parametric models and non-parametric models, where the parametric models include a fix number of parameters and the non-paramedic models grow the number of parameters based at least in part on the amount of historical data and/or other data used in building the model.

Figure 4:
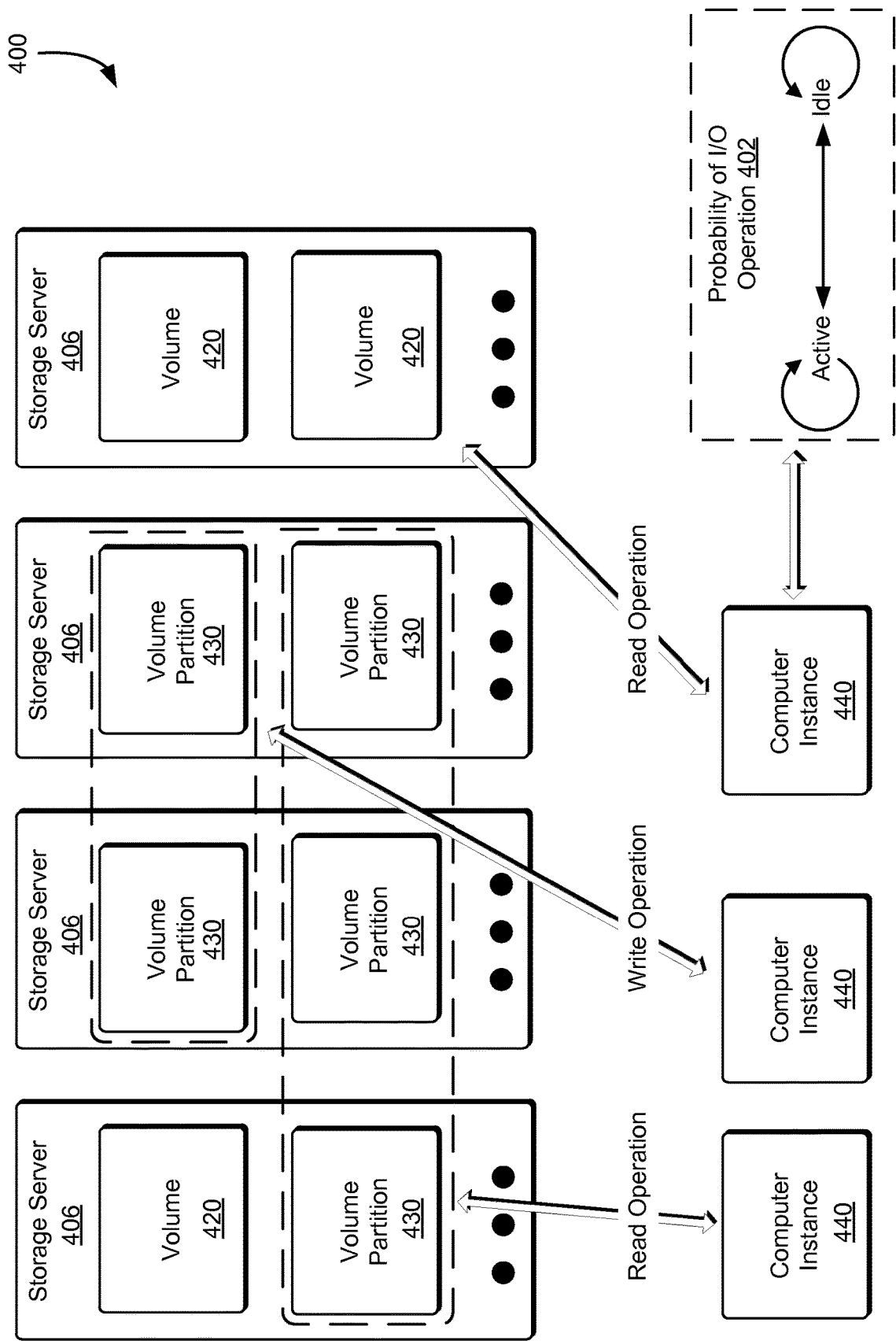
FIG. 4 illustrates an example environment where a simulation of customers interactions with storage servers of a remote storage service may be executed in accordance with an embodiment.

FIG. 4 illustrates an environment 400 in which various aspects of simulations of block-level devices that are attachable to one or more computer instances based on historical data may be implemented, according to at least one embodiment. The environment 400 may include a simulation of customer interactions with storage server 406 of a remote storage service. The simulation may include a set of computer instances 440 interacting with volumes 420 and/or partitioned volumes 430 implemented by the storage servers 406 based at least in part on a probability of I/O operations 402. The probability of I/O operations 402 may represent the probability at any given time of the computer instances 440 changing state or remaining in the current state.

The probability of I/O operations 402 may be a hierarchical probability model consisting of multiple random or pseudorandom variables to determine whether to transitions between states or remain in the same state. The probability of I/O operations 402 may include a probability distribution for each type of operation as well as each state. Such that, for an active computer instance 440, there may be a probability P1 that, at a given time, there will be 1 read operation, a probability P2 that there will be 2 read operations, a probability P3 that there will be 3 read operations, where the sum of all of the Pi is one. The probability of I/O operations 402 may include a distribution for read and/or write operations when the drive is in an active state and a distribution for read and/or write operations when the drive is in an idle state. The probability of I/O operations 402 may be used to calculate the probability distribution for a plurality of volumes 420 and/or partitioned volumes 430.

In various embodiments, the probability distribution for the volumes 420 and/or partition volumes 430 may be used to determine number of I/O operations for a particular volume when running simulations of various server configurations as opposed to the historical data. Returning to FIG. 4, when performing the simulation, the modeling system, may assign a particular volume a state at random and use the probability of I/O operations 402 to determine whether the volume will change states at a given time. If the particular volume active the IOPS may be added to the total number of IOPS for all volumes currently active on the simulated storage server. As illustrated by FIG. 4, the probability of I/O operations 402 include at least two state active and idle where the arrows indicate a transition between states or maintaining the current state. The probability of I/O operations 402 may be represented by a four by four transition matrix a probability of transitioning states given a set of inputs. When executing the simulations the probability of I/O operations 402 may be used to determine whether a particular computer instance is active or idle, e.g., is the computer instance submitting a read or write operation to the storage services 406 at a particular interval of time.

Four storage servers 406 are shown in FIG. 4. A partitioned volume 430 is illustrated, with five partitions, while three non-partitioned volumes 420 are shown. In some embodiments in which partitioned volumes are supported, non-partitioned volumes may simply be managed as volumes that each comprise a single partition. Both partitioned and non-partitioned volumes may be attached to multiple computer instances in the depicted embodiment, e.g., as a result of various customer requests to attach a volume. Partitioned volume 430 may be attached to multiple computer instances, while non-partitioned volume 420 may be attached to a single computer instance. A given computer instance such as 440 may be attached to more than one multiply-attached volume (such as 430) in at least some embodiments. Various configurations of the storage servers may be simulated and tested using the historical data as described above. Although only one configuration of the storage servers 406 is shown in FIG. 4, any number of hardware and/or software configurations may be simulated in environment 400 for the purpose of determining performance of various configuration of the storage server 406 and/or optimizing the storage server 406 on one or more dimensions, such as, power consumption, risk of degradation, performance, and other dimensions described above.

The computer instance 440 may be a virtual machine or other computer system including logically attached to the volumes 420 or partition volumes 430. The customer interactions with the volumes 420 and/or partition volumes 430 may include submissions of I/O requests from the computer instances 440 to the volumes 420 and/or partition volumes 430. Logically attaching the volumes 420 and/or partition volumes 430 to the computer instances, may include the computer instances exposing an interface to the operating system of the computer instances 440 such that the computer instance may issue I/O requests in the same manner as if the volumes 420 and/or partition volumes 430 where physically attached to the computer instances 440.

Figure 5:
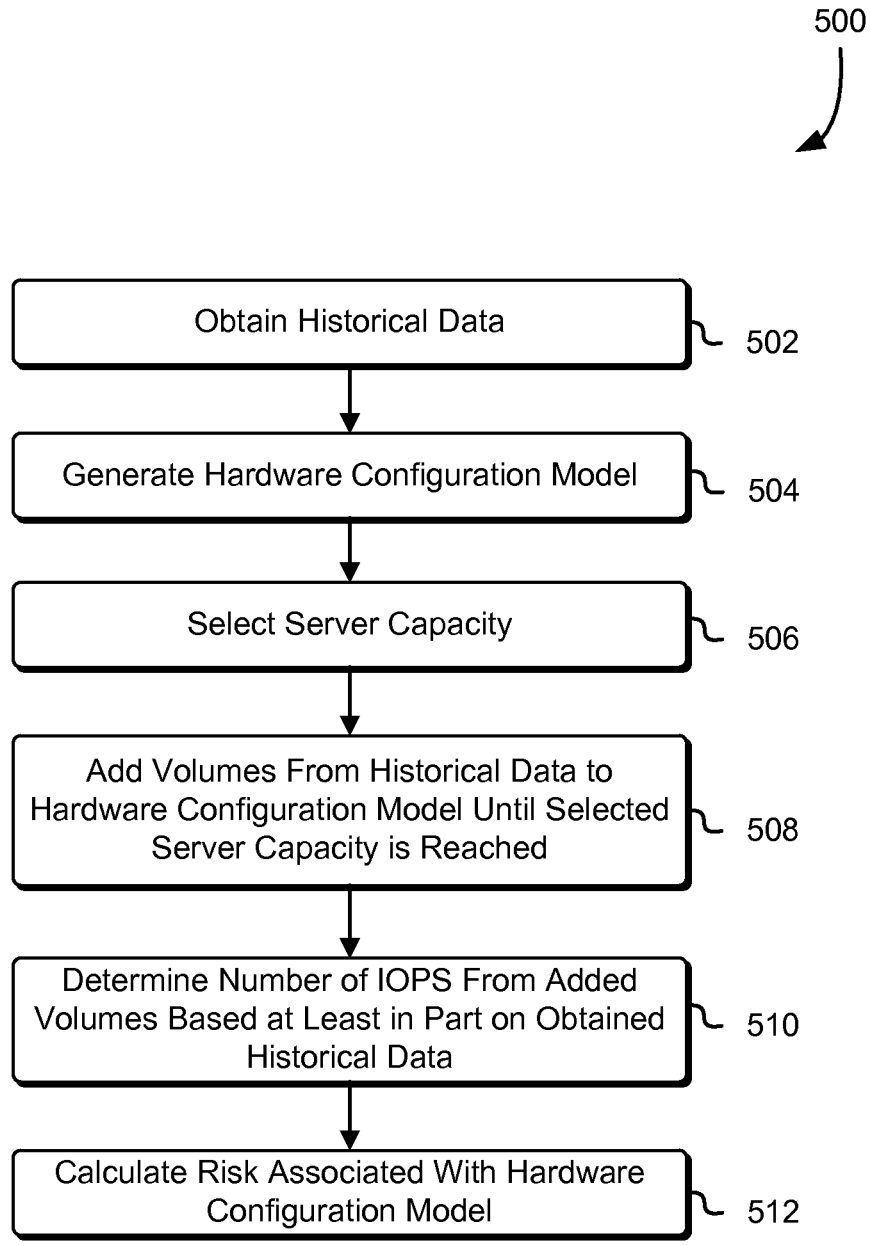
FIG. 5 illustrates a process for calculating a risk of overloading a storage server given a particular configuration of the storage server in accordance with at least one embodiment.

FIG. 5 shows an illustrative process 500 which may be used to determine a risk associated with a particular hardware and/or software configuration of a storage server utilized by a remote storage service to provide volumes to customers of the remote storage service, where the computing resources of the storage server may be oversubscribed. The process 500 may be performed by any suitable system with access to the historical data or component of the remote storage service above in connection with FIG. 1 or any combination of systems or component thereof such as the modeling subsystem described in greater detail below in connection with FIG. 7. Returning to FIG. 5, in an embodiment, the process 500 includes obtaining historical data 502. The historical data may be obtained by monitoring I/O operations of various storage servers as described above or customer requests to interact with volumes maintained by the remote storage service.

The modeling subsystem or other component of the computing resource service provider may then generate a set of hardware and/or software configuration models 504. The set of hardware and/or software configuration models may include various configurations of the storage servers as described above in connection with FIG. 4. For example, a particular storage server configuration model may contain twelve 3 TB HDD with an oversubscription rate of 30 percent. Once the hardware configuration model for the storage server has been generated, the modeling subsystem may select a server capacity 506. The server capacity may indicate an amount of volume maintained by the storage server or percentage of utilization of the storage server. For example, the selected server capacity may be 80 percent of the total capacity of the storage server. In another example, the selected server capacity may be 10 TB. The sever capacity may be selected at random or pseudorandom and may be constrained by various attributes of the storage server configuration models. For example, if the total server capacity of a particular storage server configuration model is 12 TB, the selected server capacity may be constrained to a positive number of TB less than 12 TB.

The modeling subsystem may then add volumes from the historical data to the storage server configuration models until the select server capacity is reached 508. For example, the volumes may be selected at random or pseudorandom from the historical data based at least in part on volume ID and the capacity of the volumes may be aggregated until the selected server capacity is obtained. Once a sufficient number of volumes have been added to reach the selected server capacity, the modeling subsystem may then determine a number of IOPS, to be performed by the storage server configuration model, associated with the added volumes based at least in part on the obtained historical data 510. The number of IOPS may be determined based at least in part on the number of write and/or read operations indicated in the historical data. In some embodiments, the number of write operations may require additional computing resources. For example, the volumes may be implemented such that each volume includes a master and a slave copy of the volume. When a write operation is executed by the storage server, the storage server writes the data to both the master and the slave therefore requiring two I/O operations for every one write operation.

The determined number of IOPS may represent the total load, in terms of I/O operations, for the storage server configuration model given the set of volumes attached. Furthermore, the total number of IOPS may be used to calculate a risk associated with the particular storage server configuration model being simulated 512. The risk may indicate a likelihood that the server will be overload as a result of oversubscription of computing resources during heavy customer utilization of the computing resources. The risk may be determined by calculating the individual probability distribution of a particular probability model in order to obtain the distribution for a particular server configuration. The risk may be calculated by determining the area under the curve representing the probability distribution for the server configuration at a starting point X, where X is the capacity of the server configuration, to a certain number representing a limit to of the number of IOPS customers are capable of submitting at once or to infinity. The area under the curve may represent the risk associate with the server configuration. The probability models may be configured such that the area under the curve is equal to 1 and represents the percentage of time that the server configuration would be overloaded. Furthermore, the process 500 may be executed as part of a Monte Carlo simulation where over the course of successive rounds of simulations at least steps 506 through 510 of the process 500 are repeated using a random sampling of the obtained historical data. In numerous variations to the process 500, only a portion of the hardware configurations and/or software configurations may be simulated. For example, only writes to block-level storage devices may be simulated on various hardware configurations and/or software configurations. The process 500 may also be used to determine risk associated with other attributes of the hardware and/or software configurations of the storage servers utilized by the remote storage service, such as power consumption, temperature, network throughput, network utilization, processor throughput, processor utilization, cost of the hardware and/or software configurations, or any other performance attribute associated with the hardware and/or software configuration of the storage servers utilized by a remote storage service.

In a specific example, a storage server configuration with twelve 2 TB HDD may be selected from a set of possible storage server configurations. A storage server capacity (e.g., a percentage of the total volume of the storage server utilized to store data on behalf of the customer) may be selected at random or pseudorandom from a distribution of utilized capacity of storage server volumes based at least in part on historical data. The selected storage server capacity, in this example, is 50 percent which equals 12 TB. Random selection of volumes may be performed using historical data until the 12 TB capacity has been reached. As described above, the historical data may contain information corresponding to the size and maximum number of IOPS associated with customer volumes. Selection from multiple volume size/maximum IOPS pairs may be performed. For example, during execution of the simulation, a 1 GB volume with 0 IOPS may be selected, a 1 GB volume with 150 IOPS may be selected, a 300 GB volume with 500 IOPS may be selected, and a 1 TB volume with 1000 IOPS may be selected at random or pseudorandom from the historical data. This process may continue until the 12 TB selected capacity has been reached. In other embodiments, selection involves randomly selecting a volume size and, for the selected volume size, selecting an IOPS value, where selection of the IOPS value may be made according to a measured probability distribution for volumes of the selected size and/or for a group of volume sizes (e.g., a range of sizes) into which the volume size fits into. The IOPS associated with the selected volumes may then be added together to determine the total number of IOPS for the selected volumes. A determination may then be made as to whether the total number of IOPS exceeds the capacity of the storage server configuration. This process may then be repeated over a plurality of rounds and a risk of degradation in service associated with the storage server configuration may be determined. For example, this process may be repeated 100 times and a result may indicate that 4 times the total number of IOPS exceeded the capacity of the storage server configuration. Therefore, the risk associated with the storage server configuration is 4 percent.

Figure 6:
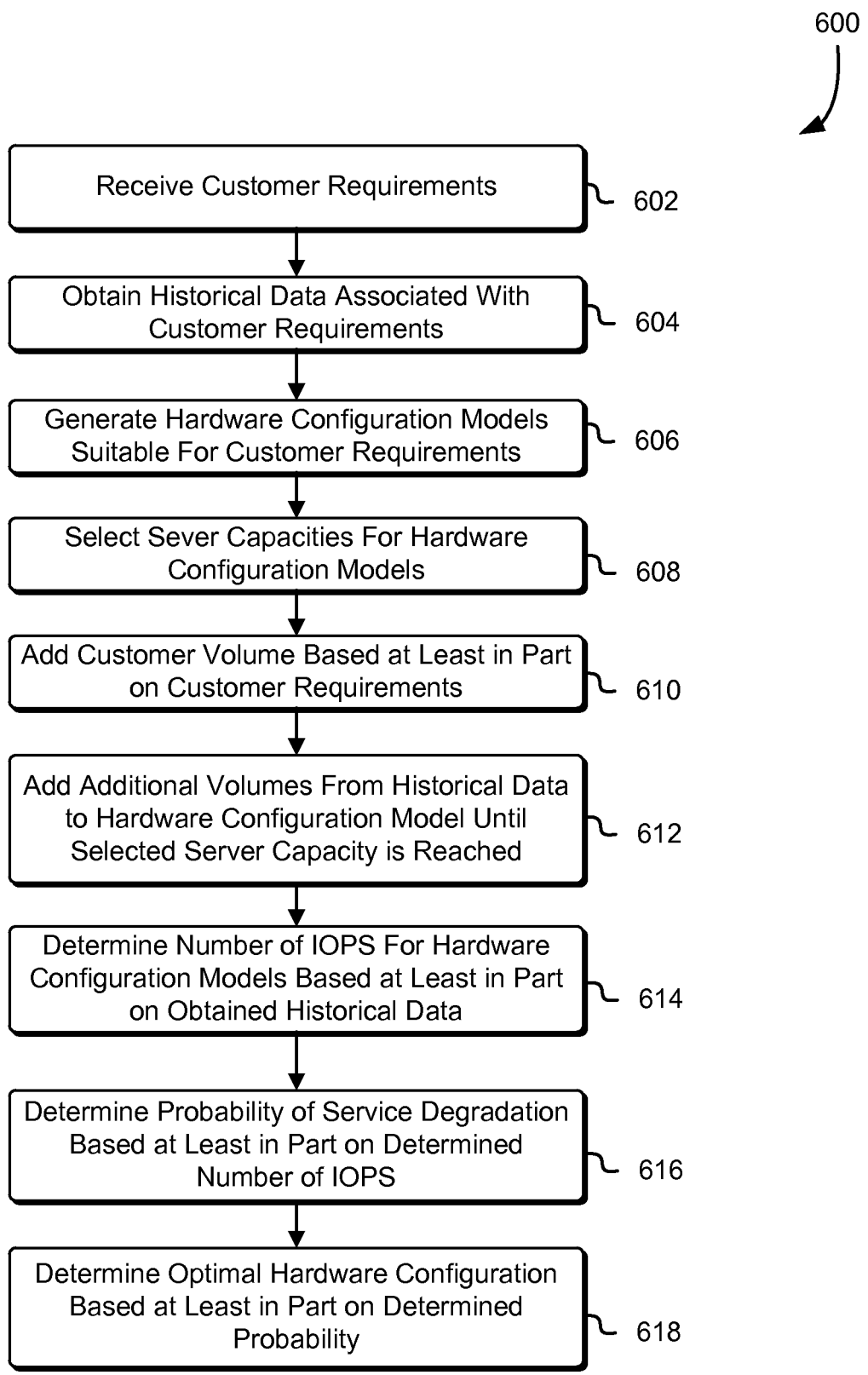
FIG. 6 illustrates a process for determining an optimal storage server configuration given a set of customer requirements in accordance with at least one embodiment.

FIG. 6 shows an illustrative process 600 which may be used to determine an optimal or preferred hardware and/or software configuration of a storage server utilized by a remote storage service to provide computing resources to a customer to execute a particular customer workload, where the computing resources of the storage server may be oversubscribed. The process 600 may be performed by any suitable system with access to the historical data or component of the remote storage service above in connection with FIG. 1 or any combination of systems or components thereof such as the modeling subsystem described in greater detail below in connection with FIG. 7. Returning to FIG. 6, in an embodiment, the process 600 includes receiving customer requirements for a set of workload 602. The customer requirements may include a size of volumes and IOPS the customer requires to execute a particular workload or implement a particular application. The customer requirements may be received through a management console or other application exposed to the customer such as the remote storage visualization browser described above in connection with FIG. 2.

The modeling subsystem or other system executing the process 600, may then obtain historical data associated with the customer requirements 604. The historical data may be obtained by monitoring I/O operations of various storage servers as described above or customer request to interact with volumes maintained by the remote storage service. Furthermore, the historical data may be associated with the customer requirements such that one or more attributes of the customer requirements are reflected in the historical data. For example, the historical data may be data collected on the customer previous usage patterns. In another example, the historical data may be obtained from volume with similar attributes as the attributes indicated in the customer requirements such as IOPS and/or volume size.

The modeling subsystem or other component of the computing resource service provider may then generate a set of hardware and/or software configuration models 606. The set of hardware and/or software configuration models may include various configurations of the storage servers as described above in connection with FIG. 4. For example, a particular storage servers configuration models may contain twelve 3 TB HDD with an oversubscription rate of 30 percent. Once the hardware configuration model for the storage server has been generated, the modeling subsystem may select a server capacity 608. The server capacity may indicate an amount of volume maintained by the storage server or percentage of utilization of the storage server. For example, the selected server capacity may be 80 percent of the total capacity of the storage server. In another example, the selected server capacity may be 10 TB. The server capacity may be selected at random or pseudorandom and may be constrained by various attributes of the storage server configuration models. For example, if the total server capacity of a particular storage server configuration model is 12 TBs, the selected server capacity may be constrained to a positive number of TBs less than 12 TB.

The modeling system may then add the customer volume to the storage server configuration model based at least in part on the customer requirements 610. For example, if the customer requirements indicate a 2 TB volume with a minimum of 200 IOPS, a volume with those requirements may be added to the storage server configuration model. The modeling subsystem may then add additional volumes from the historical data to the storage server configuration models until the select server capacity is reached 612. For example, the volumes may be selected at random or pseudorandom from the historical data based at least in part on volume ID and the capacity of the volumes may be aggregated until the selected server capacity is obtained. Once a sufficient number of volumes have been added to reach the selected server capacity, the modeling subsystem may then determine a number of IOPS, to be performed by the storage server configuration model, associated with the added volumes based at least in part on the obtained historical data 614. The number of IOPS may be determined based at least in part on the number of write and/or read operations indicated in the historical data. In some embodiments, the number of write operations may require additional computing resources. For example, the volumes may be implemented such that each volume includes a master and a slave copy of the volume. When a write operation is executed by the storage server, the storage server writes the data to both the master and the slave therefore requiring two I/O operations for every one write operations.

The determined number of IOPS may represent the total load, in terms of I/O operations, for the storage server configuration model given the set of volumes attached. Furthermore, the total number of IOPS may be used to calculate a probability of service degradation associated with the particular storage server configuration model being simulated based at least in part on the determined number of IOPS 616. For example, the modeling system may calculate the probability of the total number of IOPS exceeding that maximum number of IOPS for the storage server configuration model based at least in part on the determined number of IOPS. The probability may indicate a likelihood that the server will be overloaded as a result of oversubscription of computing resources during heavy customer utilization of the computing resources.

The modeling system may then determine an optimal hardware and/or software configuration for the customer's requirements based at least in part on the determined probability. Furthermore, the process 600 may be executed as part of a Monte Carlo simulation where over successive rounds of simulations, at least steps 604 through 616 of the process 600, are repeated using a random sampling of the obtained historical data. The successive rounds of the Monte Carlo simulation may provide a set of data points corresponding to various storage server configuration models which may be used by the modeling system to determine an optimal configuration using a variety of different techniques, such as grid searching or interpolation. In numerous variations to the process 600, the modeling system may obtain the cost of various components of the storage server configurations and determine an optimal hardware configuration based at least in part on the cost of various components included in the storage server configuration.

Figure 7:
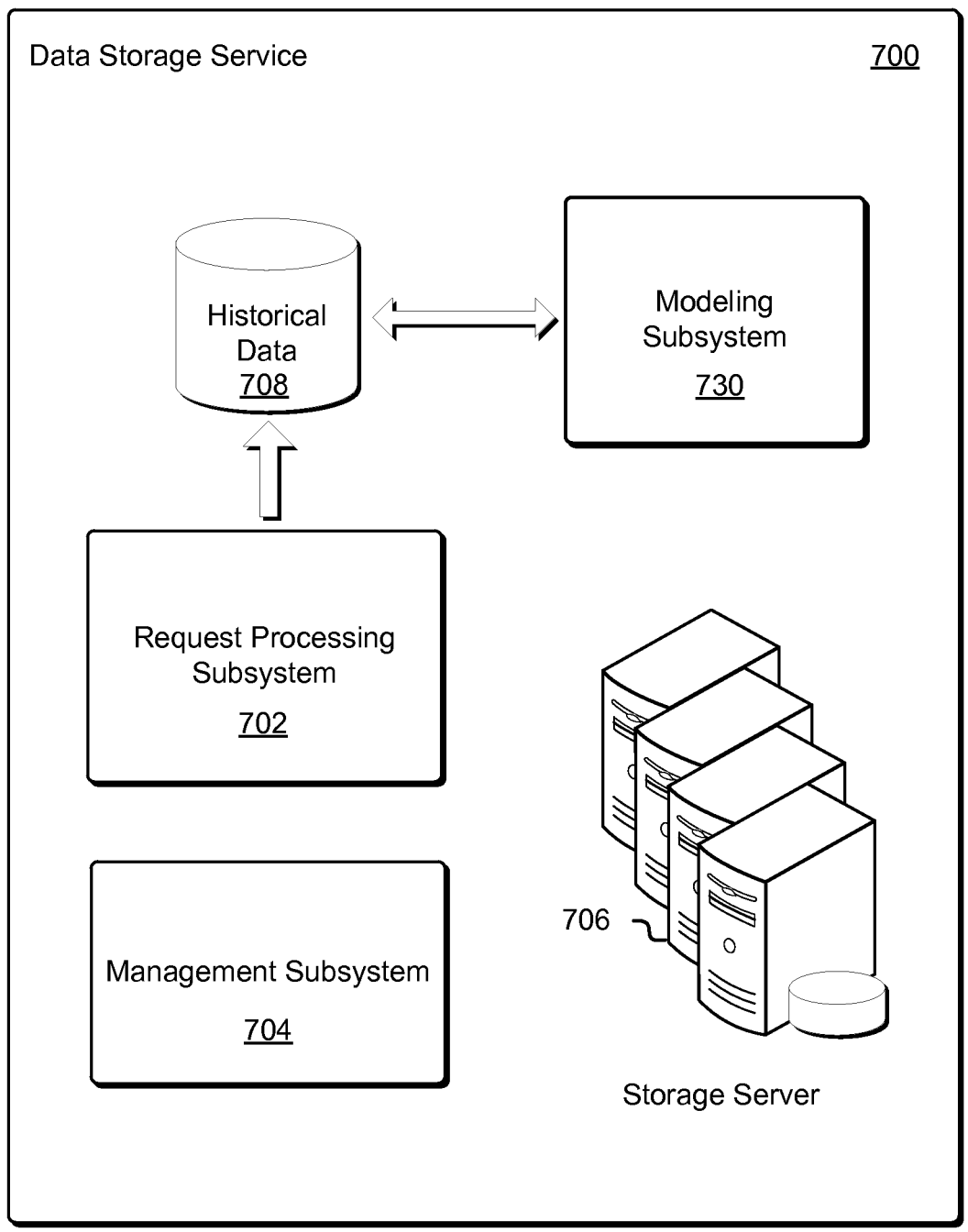
FIG. 7 shows an illustrative example of a remote storage service in accordance with various embodiments.

FIG. 7 shows an illustrative example of a remote storage service 700 in accordance with at least one embodiment. The remote storage service 700 may be a service of a computing resource provider used to operate a block-level remote storage service such as described above in connection with FIG. 1. As illustrated in FIG. 7, the remote storage service 700 includes various subsystems such as a request processing subsystem 702, a modeling subsystem 730 and a management subsystem 704. The remote storage service 700 may also include a plurality of data storage servers 706 and an historical data 708, which may store data of various customer volumes and customer interactions with the customer volumes maintained by the data storage servers 706 as described above. Furthermore, the modeling subsystem, described in greater detail below, may provide the remote data storage visualization browser illustrated above in FIG. 2.

In an embodiment, the request processing subsystem 702 is a collection of computing resources, such as webservers and application servers, collectively configured to process requests submitted to the remote storage service 700. The request processing subsystem 702, for example, may include one or more webservers that provide a web service interface to enable customers of the remote storage service 700 to submit requests to be processed by the remote storage service 700. The request may include I/O requests as described above in connection with FIG. 1. The request processing subsystem 702 may include computer systems configured to make various determinations in connection with the processing of requests, such as whether policy allows fulfillment of a request, whether requests are authentic (e.g., electronically signed using a suitable cryptographic key) and otherwise. In various embodiments, the request processing subsystem 702 may obtain historical data from the requests as described above.

Components of the request processing subsystem may interact with other components of the remote storage service 700 (e.g., through network communications). For example, some requests submitted to the request processing subsystem 702 may involve the management of computing resources which may include data objects stored by the data storage servers 706. The request processing subsystem 702, for example, may receive and process requests to modify computing resources. For instance, in some examples, data objects are logically organized into logical data containers. Data objects associated with a logical data container may, for example, be said to be in the logical data container. Requests to the data processing subsystem 702 may include requests for creating logical data containers, deleting logical data containers, providing an inventory of a logical data container, providing or updating access control policy with respect to one or more logical data containers and the like.

The requests may be processed by the management subsystem 704 upon receipt by the request processing subsystem 702. If applicable, various requests processed by the request processing subsystem 702 and/or management subsystem 704 may result in the management subsystem 704 updating metadata associated with data objects and logical data containers stored in a metadata store. Additionally, the management subsystem may include a data store configured to maintain the historical data 708, described in greater detail above. The data store, for example, may be a database or other storage device configured to store the historical data 708 as records which may be retrieved by the modeling system 730 during execution of various simulations. Other requests that may be processed by the request processing subsystem 702 include requests to perform operations in connection with data objects. The requests, for example, may include requests to upload data objects to the remote storage service 700, to download data objects from the remote storage service 700, to delete data objects stored by the remote storage service 700 and/or other operations that may be performed.

Requests processed by the request processing subsystem 702 that involve operations on data objects (e.g., upload, download, delete) may include interaction between the request processing subsystem 702 and one or more data storage servers 706. The data storage servers 706 may be computer systems communicatively coupled with one or more storage devices for the persistence of data objects. For example, in order to process a request to upload a data object, the request processing subsystem may transmit data to a data storage server 706 for persistent storage. It is noted, however, that in some embodiments, client (e.g., customer) computer systems may transmit data directly to the data storage servers 706 instead of through servers in the request processing subsystem.

In some embodiments, the request processing subsystem 702 transmits data to multiple data storage servers 706 for the purposes of redundantly storing the data to allow the retrievability of data in the event of failure of an individual data storage server 706 and/or associated data storage device. For example, in some embodiments, the request processing subsystem uses a redundancy in coding scheme such as erasure coding to deconstruct a data object into multiple parts that are stored among the data storage servers 706. The parts may be configured such that if access to a certain number of parts is lost, the data object may nevertheless be reconstructible from the remaining parts that remain accessible.

To enable efficient transfer of data between the request processing subsystem 702 and the data storage servers 706 and/or generally to enable quick processing of requests, the request processing subsystem 702 may include one or more databases that enable the location of data among the data storage servers 706. For example, the request processing subsystem 702 may operate a key-value store that serves to associate identifiers of data objects with locations among the data storage servers 706 for accessing data of the data objects.

The historical data 708 may include information corresponding to the customer interactions with various logical volumes managed by the remote storage service 700 and maintained by the remote storage service 706. Additionally, the historical data 708 may contain information corresponding to the received requests, such as information about I/O operations included in various received requests. Returning to FIG. 7, the historical data 708 may contain data structures, as described above, containing information indicating a volume ID, a timestamp, a number of read and/or write operations, a capacity of the volume, and other information as described above. Furthermore, the historical data 708 may include the cost of various hardware components of the storage server in order to enable the modeling system 730 to select storage server configurations based at least in part on the cost of various components. The cost may include a historical cost paid for various hardware components or may include the current market cost of the various hardware components. The modeling system may include the cost of the hardware in various models and use cost information when selecting a particular hardware and/or software configuration. For example, when selecting a storage server configuration and/or determining an optimal storage server configuration on one or more dimensions, the cost of the storage server may be included in the one or more dimensions. The cost of storage server configurations may have a greater influence than performance information of storage server configurations (e.g., information obtaining from performing simulations of the storage server configurations as described above) when selecting a particular storage server configuration, such that a lower cost lower performing storage server configuration may be selected over a higher cost better performing storage server configuration. However, there may be minimum performance requirements to ensure that customers utilizing selected storage server configurations would not be significantly adversely affected by any potential cost savings from selecting a particular storage server configuration based at least in part on cost. Although the cost of hardware components is described herein, the cost of software components is considered within the scope of the present disclosure, and such costs may include licensing and development costs.

In various embodiments, the modeling subsystem 730 is a collection of computing resources, such as webservers and application servers, collectively configured to simulate a variety of different storage server 706 configurations using historical data 708. The simulations may be used to determine the probability of a particular storage server configuration becoming overloaded and customers of the remote storage service receiving a degradation of service as a result. Furthermore, the modeling system 730 may provide recommendations to customers for different configurations of customer volumes in order to improve the performance of the customer's logical volume and/or reduce the cost associated with the customer's volumes. The modeling system 730 may be configured to obtain historical data 708, execute various simulations, and determine an optimal configuration of the storage servers 706 based at least in part on the historical data 708.

Figure 8:
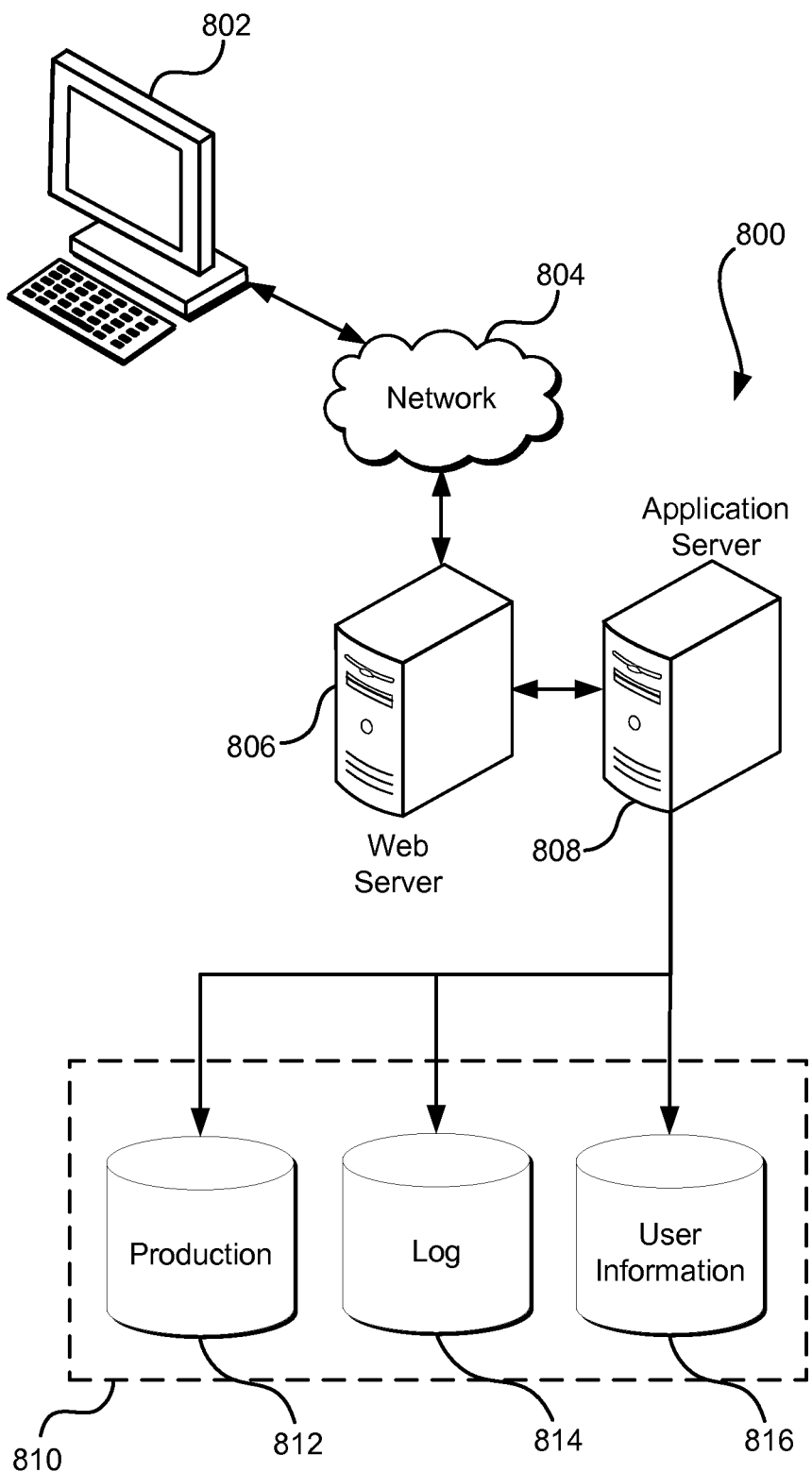
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining historical data associated with one or more logical volumes maintained by a set of storage servers of a remote storage service, where the historical data is associated with customer interaction with the one or more logical volumes;
    determining, based at least in part on customer requirements for a set of logical volumes, multiple server configurations;
    generating a set of simulation results, at least in part, by simulating the multiple server configurations multiple times by at least using the historical data to select respective subsets of the set of logical volumes for individual server configurations of the multiple server configurations and using the historical data to determine a total amount of input/output operations for individual subsets of the set of logical volumes, wherein the multiple server configurations utilize different hardware components with different performance characteristics to support at least one or more portions of the set of logical volumes;
    filtering, based at least in part on an attribute of a server configuration of the multiple server configurations, the set of simulation results to obtain a subset of the multiple server configurations;
    using the filtered set of simulation results to select, based at least in part on whether the set of simulation results indicates that the server configuration will experience an overload condition causing a degradation of service, a particular server configuration from the subset of the multiple server configurations; and
    providing information indicating the particular server configuration.

2. The computer-implemented method of claim 1, wherein the computer-implemented method further comprises modifying the historical data based at least in part on one or more constraints.

3. The computer-implemented method of claim 1, wherein the computer-implemented method further comprises providing, to a customer, a recommendation to modify one or more attributes of a particular logical volume of the one or more logical volumes based at least in part on generated set of simulation results.

4. The computer-implemented method of claim 1, wherein the multiple server configurations further includes different hardware and software configurations of the set of storage servers of the remote storage service.

5. A system, comprising:
    one or more processors;
    memory with instructions that, if executed by the one or more processors, cause the system to at least:
        obtain historical data associated with interactions with volumes maintained by a server;
        determine a set of server configurations based at least in part on customer requirements associated with a set of volumes;
        determine probabilities that individual server configurations of a subset of server configurations of the set of server configurations will become overloaded and experience degradation in service based at least in part on a set of simulation results obtained by at least simulating the set of server configurations a certain number of times, the simulating including using the historical data to at least:
            select respective subsets of the set of volumes for the individual server configurations of the subset of server configurations; and
            determine a total amount of input/output operations for the subsets of the set of volumes for the individual server configurations of the subset of server configurations, wherein: the subset of server configurations includes a plurality of server configurations that utilize different hardware components with different performance characteristics to support at least one or more portions of the volumes, and the certain number of times is a plurality of times;
        wherein the simulation results are filtered, based at least in part on an attribute of a server configuration of the set of server configurations, to obtain the subset of server configurations; and
        select a particular server configuration of the subset of server configurations based at least in part on the probabilities.

6. The system of claim 5, wherein the instructions that cause the system to select the particular server configuration of the subset of server configurations further include instructions, that if executed by the one or more processors, cause the system to select the particular server configuration based at least in part on a cost of components of the particular server configuration.

7. The system of claim 5, wherein the instructions that cause the system to obtain historical data further include instructions, that if executed by the one or more processors, cause the system to:

initialize a historical data store with one or more historical data records with pseudorandom values based at least in part on one or more constraints; and modify the one or more historical data records based at least in part on the historical data.

8. The system of claim 5, wherein the instructions that cause the system to determine probabilities that individual server configurations of the subset of server configurations will become overloaded further include instructions, that if executed by the one or more processors, cause the system to obtain the set of simulation results using a Monte Carlo simulation method.

9. The system of claim 5, the memory further includes instructions, that if executed by the one or more processors, causes the system to modify a configuration of a server of a remote storage service based at least in part on the probability that the particular server configuration of the set of server configurations will become overloaded.

10. The system of claim 5, wherein the instructions that cause the system to determine probabilities that individual server configurations of the subset of server configurations will become overloaded further include instructions, that if executed by the one or more processors, cause the system to evaluate the set of server configurations over one or more attributes including at least one of: power consumption, capacity, logical volume placement, network performance, heat generated, and operations per interval of time.

11. The system of claim 10, wherein the instructions that cause the system to select the particular server configuration further include instructions, that if executed by the one or more processors, cause the system to provide a solution taking into account multiple attributes of the particular server configuration.

12. The system of claim 5, wherein the customer requirements indicate a workload to be executed by a customer using one or more servers of a remote storage service.

13. A non-transitory computer-readable storage medium having stored thereon executable instructions that, if executed by one or more processors of a computer system, cause the computer system to at least:

obtain historical data indicating interactions with one or more volumes of a set of servers;

perform a set of simulations to obtain a set of simulation results by at least simulating various server configurations multiple times using the historical data to select respective portions of the volumes of the one or more volumes for individual server configurations of the various server configurations and to determine a total amount of input/output operations for the portions of the volumes of the one or more volumes based at least in part on the historical data, the various server configurations being determined based at least in part on customer requirements for the one or more volumes, wherein the various server configurations utilize different hardware components with different performance characteristics to support at least one or more portions of the one or more volumes;

filter, based at least in part on an attribute of at least a server configuration of the various server configurations, the simulation results to obtain a subset of server configurations of the various server configurations;

determine a result indicating which of the subset of the various server configurations is likely to cause the set of servers to become oversubscribed so as to cause a service degradation; and select a server configuration of the subset of the various server configurations based at least in part on the result.

14. The non-transitory computer-readable storage medium of claim 13, wherein the various server configurations further includes a modification to at least one hardware components of a particular server of the set of servers selected from the following: hard disk drives, network interface, processor, server rack, and switches.

15. The non-transitory computer-readable storage medium of claim 13, wherein the various server configurations further includes a modification to at least one software components of a particular server of the set of servers selected from the following: logical volume placement algorithm, networking protocol, network flow hashing, operating system, request processing throttling algorithm and hypervisor.

16. The non-transitory computer-readable storage medium of claim 13, wherein the executable instructions further comprise instructions that, if executed by the one or more processors, cause the computer system to modify a price associated with a particular volume of the one or more volumes based at least in part on the set of simulations.

17. The non-transitory computer-readable storage medium of claim 13, wherein the executable instructions further comprise instructions that, if executed by the one or more processors, cause the computer system to:

receive a request to execute a workload using at least one server of the set of servers;

perform an additional simulation including the workload based at least in part on the historical data; and provide, in response to the request, a selected configuration of the workload to be performed by the at least one server of the set of servers.

18. The non-transitory computer-readable storage medium of claim 13, wherein the executable instructions that cause the computer system to execute the set of simulations further include instructions that cause the computer system to execute the set of simulations by at least executing a subset of simulations of the set of simulations using one or more constraints on performance of a server configuration being simulated.

19. The non-transitory computer-readable storage medium of claim 13, wherein the executable instructions further comprise instructions that, if executed by the one or more processors, cause the computer system to determine a load on at least one server of the set of servers based at least in part on the result of the set of simulations.

20. The non-transitory computer-readable storage medium of claim 19, wherein the executable instructions further comprise instructions that, if executed by the one or more processors, cause the computer system to reduce an amount of advertised capacity of the at least one server of the set of servers based at least in part on the load.

21. The computer-implemented method of claim 1, further comprising:

determining, for the particular server configuration, an input/output operation per server (IOPS) threshold above which a degradation in service may occur; and causing the IOPS threshold to be sent for display.

* * * * *